(12) United States Patent
Zhang

(10) Patent No.: US 9,485,162 B2
(45) Date of Patent: Nov. 1, 2016

(54) METHOD AND SYSTEM FOR MEASURING FRAME LOSS RATIO

(75) Inventor: Fuyou Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 202 days.

(21) Appl. No.: 14/118,270

(22) PCT Filed: Mar. 23, 2012

(86) PCT No.: PCT/CN2012/072871
§ 371 (c)(1),
(2), (4) Date: Nov. 18, 2013

(87) PCT Pub. No.: WO2012/155675
PCT Pub. Date: Nov. 22, 2012

(65) Prior Publication Data
US 2014/0098699 A1  Apr. 10, 2014

(30) Foreign Application Priority Data
May 17, 2011  (CN) .......................... 2011 1 0127882

(51) Int. Cl.
*H04L 12/26* (2006.01)
*H04W 24/00* (2009.01)
*H04B 17/00* (2015.01)

(52) U.S. Cl.
CPC ........... *H04L 43/0835* (2013.01); *H04L 43/50* (2013.01); *H04B 17/003* (2013.01); *H04L 43/10* (2013.01); *H04W 24/00* (2013.01)

(58) Field of Classification Search
None
See application file for complete search history.

(56) References Cited

U.S. PATENT DOCUMENTS

| 6,907,006 B1* | 6/2005 | Sakamoto et al. | 370/236.2 |
| 7,441,906 B1* | 10/2008 | Wang et al. | 353/70 |
| 8,269,887 B2* | 9/2012 | Mizuno | 348/448 |
| 8,538,886 B1* | 9/2013 | Iu et al. | 705/51 |
| 2001/0009547 A1* | 7/2001 | Jinzaki et al. | 370/390 |
| 2002/0126258 A1* | 9/2002 | Honda | 352/92 |

(Continued)

FOREIGN PATENT DOCUMENTS

| CN | 1842033 A | 10/2006 |
| CN | 101707509 A | 5/2010 |

(Continued)

OTHER PUBLICATIONS

International Search Report for corresponding application PCT/CN2012/072871 filed Mar. 23, 2012; Mail date Jun. 21, 2012.

(Continued)

*Primary Examiner* — Jeffrey M Rutkowski
*Assistant Examiner* — Jonathan B Wood
(74) *Attorney, Agent, or Firm* — Cantor Colburn LLP

(57) ABSTRACT

The disclosure provides a method for measuring a frame loss ratio. A first end acquires a frame number of a received current measurement reply frame and a frame number of a received previous measurement reply frame, and judges whether the difference between the frame number of the current measurement reply frame and the frame number of the previous measurement reply frame is 1; if the difference is 1, the first end calculates the frame loss ratio according to count information carried in the current measurement reply frame and the previous measurement reply frame; and if the difference is greater than 1, the first end calculates the frame loss ratio according to the count information carried in the current measurement reply frame and the previous measurement reply frame and the difference.

8 Claims, 5 Drawing Sheets

(56) References Cited

U.S. PATENT DOCUMENTS

| | | | |
|---|---|---|---|
| 2002/0196265 A1* | 12/2002 | Selig et al. | 345/620 |
| 2003/0184713 A1* | 10/2003 | Honda | 352/92 |
| 2006/0092847 A1* | 5/2006 | Mohan | 370/241.1 |
| 2006/0119614 A1* | 6/2006 | Fukui et al. | 345/611 |
| 2006/0136614 A1* | 6/2006 | Kakani et al. | 710/30 |
| 2006/0193534 A1* | 8/2006 | Hirose | 382/291 |
| 2006/0209701 A1* | 9/2006 | Zhang et al. | 370/249 |
| 2008/0031146 A1* | 2/2008 | Kwak et al. | 370/250 |
| 2008/0045185 A1* | 2/2008 | Lee et al. | 455/412.2 |
| 2008/0310533 A1* | 12/2008 | Bargauan | 375/260 |
| 2009/0128323 A1* | 5/2009 | Milbar | 340/539.1 |
| 2009/0190849 A1* | 7/2009 | Huang | 382/244 |
| 2009/0196188 A1 | 8/2009 | Takeyoshi | |
| 2009/0238469 A1* | 9/2009 | Subramanian | 382/209 |
| 2010/0302949 A1* | 12/2010 | Fukagawa | 370/241.1 |
| 2011/0158112 A1* | 6/2011 | Finn et al. | 370/252 |
| 2011/0194453 A1* | 8/2011 | Yamasaki | 370/252 |
| 2011/0306305 A1* | 12/2011 | Huang | 455/67.11 |
| 2012/0026359 A1* | 2/2012 | Fukushima et al. | 348/226.1 |
| 2012/0026869 A1* | 2/2012 | Wang et al. | 370/230 |
| 2012/0076013 A1* | 3/2012 | Cheng | 370/252 |
| 2012/0209612 A1* | 8/2012 | Bilobrov | 704/270 |
| 2012/0242706 A1* | 9/2012 | Zhang | 345/666 |
| 2012/0320758 A1* | 12/2012 | Jocha et al. | 370/241.1 |
| 2013/0088994 A1* | 4/2013 | Guo et al. | 370/252 |
| 2013/0091408 A1* | 4/2013 | O'Connell et al. | 714/819 |
| 2013/0170388 A1* | 7/2013 | Ito et al. | 370/252 |
| 2015/0117195 A1* | 4/2015 | Toy | 370/232 |

FOREIGN PATENT DOCUMENTS

| | | |
|---|---|---|
| CN | 101800679 A | 8/2010 |
| CN | 102215144 A | 10/2011 |

OTHER PUBLICATIONS

D. Frost, et al., Cisco Systems, "Packet Loss and Delay Measurement for MPLS Networks draft-ietf-mpls-loss-delay-02", No. 2, Apr. 20, 2011, pp. 1-50, XP015075389.

Editor Y 1731: Draft revised Recommedation ITU-T Y. 1731; IEE Draft: IEEE-SA, vol. 802.1, No. Rev1, Mar. 10, 2011, pp. 1-96.

European Search Report for corresponding application EP 12 78 6399; Report dated Jan. 5, 2015.

Jeong-Dong Ryoo, "Considerations on Unsolicited ETYH-LM", International Telecommunication Union, vol. 5, Nov. 18, 2005, pp. 1-3, XP017535288.

* cited by examiner

| | |
|---|---|
| Type = 31 | 1 |
| Length | 2-3 |
| OUI | 4-6 |
| Sub-Type | 7 |
| Value | 8-11 |

METHOD AND SYSTEM FOR MEASURING FRAME LOSS RATIO

TECHNICAL FIELD

The disclosure relates to the field of communications, and particularly, to a method and system for measuring frame loss ratio.

BACKGROUND

Ethernet technology is simple, easy to use and cheap in price, and has been widely used in the range of local area networks, metropolitan area networks, and wide area networks. With the extensive use of Ethernet, the Operation, Administration and Maintenance (OAM) technique of the Ethernet has become increasingly important.

IEEE 802.1ag Connectivity Fault Management (CFM) defines the OAM functions and mechanisms used in the Ethernet service layer. ITU-T Y.1731 is a complement and enhancement to IEEE 802.1ag, complements the OAM function for error management and mainly enhances the OAM function for performance monitoring. In the IEEE 802.1ag draft, the network administrator, on the basis of the purpose of management and maintenance, divides the network into a number of nestable maintenance domains, a single maintenance domain being as shown in FIG. 1.

The maintenance domain in FIG. 1 define a series of maintenance points on edge devices and internal devices, in which hollow points represent Maintenance association End Points (MEPs), and solid points represent Maintenance domain Intermediate Points (MIPs). The OAM at the Ethernet service layer realizes the management and maintenance functions through the MEPs and MIPs.

The frame loss ratio measurement based on ITU-T Y.1731, which is carried out between two MEPs, is an important constituent part of Ethernet OAM technology and is an important means for performance monitoring. ITU-T Y.1731 defines two methods for measuring the frame loss ratio: single-ended frame loss ratio measurement (single-ended ETH-LM) and dual-ended frame loss ratio measurement (dual-ended ETH-LM). By periodically sending and receiving, between two MEPs, protocol frames loss measurement message (LMM) used for frame loss ratio measurement, loss measurement reply (LMR) and continuity check message (CCM)), two-way frame loss ratio measurements of a link are achieved. Each MEP maintains two counters as follows:

TxFCl: counter for in-profile data frames transmitted towards the peer MEP;

RxFCl: counter for in-profile data frames received from the peer MEP.

In the process of measurement, the MEPs at both ends will add values of the above-mentioned two counters into the protocol frame. The frame loss ratio measurement is carried out using the values of these counters.

The end initiating a frame loss ratio measurement is called the active end, and the other end is called the passive end. For single-ended frame loss ratio measurements, frame loss ratio measurements are carried out at the active end, which can measure the two-way frame loss ratio of a link according to the value of the data frame counter carried in the received LMR and the value of the local counter. For dual-ended frame loss ratio measurements, frame loss ratio measurements are carried out at both ends, with each end being able to measure the two-way frame loss ratio of the link according to the value of the data frame counter carried in the received CCM. Therefore, for dual-ended frame loss ratio measurements, both ends serve as the active end and the passive end at the same time, while for a certain measurement, it is still possible to call one end as the active end and the other end as the passive end.

The working principle of single-ended frame loss ratio measurements is as shown in FIG. 2, and the working principle of dual-ended frame loss ratio measurements is as shown in FIG. 3. The parts shown in italics in the figures represent the counter values newly added into the protocol frame during protocol frame interaction.

The formula given by ITU-T Y.1731 for calculating the single-ended frame loss is as shown in Formula 1, and the formula for calculating the dual-ended frame loss is as shown in Formula 2.

Far end frame loss=|TxFCf[tc]−TxFCf[tp]|−|RxFCf[tc]−RxFCf[tp]|  (Formula 1);

Near end frame loss=|TxFCb[tc]−TxFCb[tp]|−|RxFCl[tc]−RxFCl[tp]|  (Formula 1);

Far end frame loss=|TxFCb[tc]−TxFCb[tp]|−|RxFCb[tc]−RxFCb[tp]|  (Formula 2);

Near end frame loss=|TxFCf[tc]−TxFCf[tp]|−|RxFCl[tc]−RxFCl[tp]|  (Formula 2);

where [tc] represents the counter value in the currently received protocol frame and the local counter value at this moment, and [tp] represents the counter value in the protocol frame received at a previous measurement point and the local counter value at that moment.

However, the above-mentioned calculation process is set up on the basis that all the protocol frames used for measuring the frame loss ratio can be transmitted reliably, but an Ethernet link is not capable of providing such a guarantee. Once the situation where a protocol frame is lost during transmission over the link happens, it will cause errors in the flame loss ratio measurements.

As regards the problem in the related technique that frame loss ratio measurement is inaccurate in the case that a protocol frame is lost, no effective solution has yet come up.

SUMMARY

The embodiments of the disclosure provide a method and system for measuring frame loss ratio to at least solve the problem in the related technique that frame loss ratio measurement is inaccurate in the case that a protocol frame is lost.

According to one aspect of the disclosure, a method for measuring the frame loss ratio is provided, including: a first end acquiring a frame number of a received current measurement reply frame and a frame number of a received previous measurement reply frame, wherein the current measurement reply frame and the previous measurement reply frame are sent by a second end in response to a frame loss ratio measurement message frame sent by the first end; the first end judging whether the difference between the frame number of the current measurement reply frame and the frame number of the previous measurement reply frame is 1; if the difference is 1, the first end calculating the frame loss ratio according to count information carried in the current measurement reply frame and the previous measurement reply frame; and if the difference is greater than 1, the first end calculating the frame loss ratio according to count information carried in the current measurement reply frame and the previous measurement reply frame and the difference.

The step of the first end calculating the frame loss ratio according to the count information carried in the current measurement reply frame and the previous measurement reply frame includes: far-end frame loss ratio=(|TxFCf[tc]−TxFCf[tp]|−|RxFCf[tc]−RxFCf[tp]|)/frame sending interval of the frame loss ratio measurement message frame; near-end frame loss ratio=(|TxFCb[tc]−TxFCb[tp]|−|RxFCl[tc]−RxFCl[tp]|)/frame sending interval of the frame loss ratio measurement message frame; wherein the far-end frame loss ratio is the frame loss ratio of the second end under the circumstance that the first end sends the frame loss ratio measurement message frame, and the near-end frame loss ratio is the frame loss ratio of the first end under the circumstance that the first end sends the frame loss ratio measurement message frame; TxFCf[tc] is the number of sent frames of the first end when sending the current frame loss ratio measurement message frame, and is carried in the current measurement reply frame; TxFCf[tp] is the number of sent frames of the first end when sending the previous frame loss ratio measurement message frame, and is carried in the previous measurement reply frame; RxFCf[tc] is the number of received frames of the second end when receiving the current frame loss ratio measurement message frame, and is carried in the current measurement reply frame; RxFCf[tp] is the number of received frames of the second end when receiving the previous frame loss ratio measurement message frame, and is carried in the previous measurement reply frame; TxFCb[tc] is the number of sent frames of the second end when sending the current measurement reply frame, and is carried in the current measurement reply frame; TxFCb[tp] is the number of sent frames of the second end when sending the previous measurement reply frame, and is carried in the previous measurement reply frame; RxFCl[tc] is the number of received frames of the first end when receiving the current measurement reply frame, and is recorded in the first end; and RxFCl[tp] is the number of received frames of the first end when receiving the previous measurement reply frame, and is recorded in the first end.

If the second end sends to the first end a frame loss ratio measurement message frame when the first end sends to the second end a frame loss ratio measurement message frame, the method further includes: calculating the frame loss ratio in the following steps under the circumstance that both the first end and the second end send the frame loss ratio measurement message frame to each other: far-end frame loss ratio=(|TxFCb[tc]−TxFCb[tp]|−|RxFCb[tc]−RxFCb[tp]|)/frame sending interval of the frame loss ratio measurement message frame; near-end frame loss ratio=(|TxFCf[tc]|TxFCf[tp]|−|RxFCl[tc]−RxFCl[tp]/frame sending interval of the frame loss ratio measurement message frame; wherein with respect to the first end, the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame; and with respect to the second end, the far-end frame loss ratio is the frame loss ratio of the first end in the case that the second end sends the frame loss ratio measurement message frame, and the near-end frame loss ratio is the frame loss ratio of the second end in the case that the second end sends the frame loss ratio measurement message frame; TxFCf[tc] is the number of sent frames of the present end when sending the current frame loss ratio measurement message frame, and is carried in the current measurement reply frame; TxFCf[tp] is the number of sent frames of the present end when sending the previous frame loss ratio measurement message frame, and is carried in the previous measurement reply frame; RxFCb[tc] is the number of received frames of the present end when receiving the current frame loss ratio measurement message frame sent by the opposite end, and is carried in the current measurement reply frame; RxFCb[tp] is the number of received frames of the present end when receiving the previous frame loss ratio measurement message frame sent by the opposite end, and is carried in the previous measurement reply frame; TxFCb[tc] is the number of sent frames of the opposite end when sending the current frame loss ratio measurement message frame, and is carried in the current measurement reply frame; TxFCb[tp] is the number of sent frames of the opposite end when sending the previous frame loss ratio measurement message frame, and is carried in the previous measurement reply frame; RxFCl[tc] is the number of received frames of the opposite end when receiving the current frame loss ratio measurement message frame sent by the present end, and is carried in the current measurement reply frame; and RxFCl[tp] is the number of received frames of the opposite end when receiving the previous frame loss ratio measurement message frame sent by the present end, and is carried in the previous measurement reply frame; wherein the present end is the first end in the case that the first end sends the frame loss ratio measurement message frame, and is the second end in the case that the second end sends the frame loss ratio measurement message frame; and the opposite end is the second end in the case that the first end sends the frame loss ratio measurement message frame, and is the first end in the case that the second end sends the frame loss ratio measurement message frame.

After the first end judges whether the difference between the frame number of the current measurement reply frame and the frame number of the previous measurement reply frame is 1, the method further includes: if the first end judges that the difference between the frame number of the current measurement reply frame and the frame number of the previous measurement reply frame is 0, stopping current measurement.

The step of the first end calculating the frame loss ratio according to the count information carried in the current measurement reply frame and the previous measurement reply frame and the difference between the frame number of the current measurement reply frame and the frame number of the previous measurement reply frame includes: far-end frame loss ratio=(|TxFCf[tc]−TxFCf[tp]|−|RxFCf[tc]−RxFCf[tp]|)/(frame sending interval of the frame loss ratio measurement message frame*(N[tc]−N[tp])); near-end frame loss ratio=(|TxFCb[tc]−TxFCb[tp]|−|RxFCl[tc]−RxFCl[tp]|)/(frame sending interval of the frame loss ratio measurement message frame*(N[tc]−N[tp])); wherein the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame; TxFCf[tc] is the number of sent frames of the first end when sending the current frame loss ratio measurement message frame, and is carried in the current measurement reply frame; TxFCf[tp] is the number of sent frames of the first end when sending the previous frame loss ratio measurement message frame, and is carried in the previous measurement reply frame; RxFCf[tc] is the number of received frames of the second end when receiving the current frame loss ratio measurement message frame, and is carried in the current measurement reply frame; RxFCf[tp] is the number of received frames of the second end when receiving the previous frame loss ratio measurement message frame, and is carried in the previous measurement reply frame; TxFCb[tc] is the number of sent frames of the second end when sending the current measurement reply frame, and is carried in the current measurement reply frame; TxFCb[tp] is the number of sent frames of the second end when sending the previous measurement reply frame, and is carried in the previous measurement reply frame; RxFCl[tc] is the number of received frames of the first end when receiving the current measurement reply frame, and is recorded in the first end; and RxFCl[tp] is the number of received frames of the first end when receiving the previous measurement reply frame, and is recorded in the first end; N[tc] is the frame number of the current measurement reply frame and is carried in the current measurement reply frame; and N[tp] is the frame number of the previous measurement reply frame and is carried in the previous measurement reply frame.

If the second end sends to the first end a frame loss ratio measurement message frame when the first end sends to the second end a frame loss ratio measurement message frame, the method further includes: calculating the frame loss ratio in the following steps under the circumstance that both the first end and the second end send the frame loss ratio measurement message frame to each other: far-end frame loss ratio=(|TxFCb[tc]−TxFCb[tp]|−|RxFCb[tc]−RxFCb[tp]|)/(frame sending interval of the frame loss ratio measurement message frame*(N[tc]−N[tp])); near-end frame loss ratio=(|TxFCf[tc]−TxFCf[tp]|−|RxFCl[tc]−RxFCl[tp]|)/(frame sending interval of the frame loss ratio measurement message frame*(N[tc]−N[tp])); wherein with respect to the first end, the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame; and with respect to the second end, the far-end frame loss ratio is the frame loss ratio of the first end in the case that the second end sends the frame loss ratio measurement message frame, and the near-end frame loss ratio is the frame loss ratio of the second end in the case that the second end sends the frame loss ratio measurement message frame; TxFCf[tc] is the number of sent frames of the present end when sending the current frame loss ratio measurement message frame, and is carried in the current measurement reply frame; TxFCf[tp] is the number of sent frames of the present end when sending the previous frame loss ratio measurement message frame, and is carried in the previous measurement reply frame; RxFCb[tc] is the number of received frames of the present end when receiving the current frame loss ratio measurement message frame sent by the opposite end, and is carried in the current measurement reply frame; RxFCb[tp] is the number of received frames of the present end when receiving the previous frame loss ratio measurement message frame sent by the opposite end, and is carried in the previous measurement reply frame; TxFCb[tc] is the number of sent frames of the opposite end when sending the current frame loss ratio measurement message frame, and is carried in the current measurement reply frame; TxFCb[tp] is the number of sent frames of the opposite end when sending the previous frame loss ratio measurement message frame, and is carried in the previous measurement reply frame; RxFCl[tc] is the number of received frames of the opposite end when receiving the current frame loss ratio measurement message frame sent by the present end, and is carried in the current measurement reply frame; RxFCl[tp] is the number of received frames of the opposite end when receiving the previous frame loss ratio measurement message frame sent by the present end, and is carried in the previous measurement reply frame; N[tc] is the frame number of the current measurement reply frame and is carried in the current measurement reply frame; and N[tp] is the frame number of the previous measurement reply frame and is carried in the previous measurement reply frame; wherein the present end is the first end in the case that the first end sends the frame loss ratio measurement message frame, and is the second end in the case that the second end sends the frame loss ratio measurement message frame; and the opposite end is the second end in the case that the first end sends the frame loss ratio measurement message frame, and is the first end in the case that the second end sends the frame loss ratio measurement message frame.

According to another aspect of the disclosure, a system for measuring a frame loss ratio is provided, including: an acquisition unit, configured to acquire a frame number of a current measurement reply frame received by a first end and a frame number of a previous measurement reply frame received by the first end, wherein the current measurement reply frame and the previous measurement reply frame are sent by a second end in response to a frame loss ratio measurement message frame sent by the first end; a judgment unit, configured to judge whether the difference between the frame number of the current measurement reply frame and the frame number of the previous measurement reply frame is 1; and a calculation unit, configured to calculate the frame loss ratio according to count information carried in the current measurement reply frame and the previous measurement reply frame if the difference is 1; and calculate the frame loss ratio according to the count information carried in the current measurement reply frame and the previous measurement reply frame and the difference if the difference is greater than 1.

The system further includes: a stopping unit, configured to stop current measurement when the difference between the frame number of the current measurement reply frame and the frame number of the previous measurement reply frame is equal to 0.

The calculation unit includes: a first calculation module, configured to calculate the frame loss ratio according to the following formulas when the difference between the frame number of the current measurement reply frame and the frame number of the previous measurement reply frame is greater than 1: far-end frame loss ratio=(|TxFCf[tc]−TxFCf[tp]|−|RxFCf[tc]−RxFCf[tp]|)/(frame sending interval of the frame loss ratio measurement message frame*(N[tc]−N[tp])); near-end frame loss ratio=(|TxFCb[tc]−TxFCb[tp]|−|RxFCl[tc]−RxFCl[tp]|)/(frame sending interval of the frame loss ratio measurement message frame*(N[tc]−N[tp])); wherein the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame; TxFCf[tc] is the number of sent frames of the first end when sending the current frame loss ratio measurement message frame, and is carried in the current measurement reply frame; TxFCf[tp] is the number of sent frames of the first end when sending the previous frame loss ratio measurement message frame, and is carried in the previous measurement reply frame; RxFCf[tc] is the number of received frames of the second end when receiving the current frame loss ratio measurement message frame, and is carried in the current measurement reply frame; RxFCf[tp] is the number of received frames of the second end when receiving the previous frame loss ratio measurement message frame, and is carried in the previous measurement reply frame; TxFCb[tc] is the number of sent frames of the second end when sending the current measurement reply frame, and is carried in the current measurement reply frame; TxFCb[tp] is the number of sent frames of the second end when sending the previous measurement reply frame, and is carried in the previous measurement reply frame; RxFCl[tc] is the number of received frames of the first end when receiving the current measurement reply frame, and is recorded in the first end; and RxFCl[tp] is the number of received frames of the first end when receiving the previous measurement reply frame, and is recorded in the first end; N[tc] is the frame number of the current measurement reply frame and is carried in the current measurement reply frame; and N[tp] is the frame number of the previous measurement reply frame and is carried in the previous measurement reply frame.

The calculation unit includes: a second calculation module, configured to, in the case that the second end sends to the first end a frame loss ratio measurement message frame when the first end sends to the second end a frame loss ratio measurement message frame, calculate the frame loss ratio according to the following formulas under the circumstance that both the first end and the second end send the frame loss ratio measurement message frame to each other: far-end frame loss ratio=(|TxFCb[tc]−TxFCb[tp]|−|RxFCb[tc]−RxFCb[tp]|)/(frame sending interval of the frame loss ratio measurement message frame*(N[tc]−N[tp])); near-end frame loss ratio=(|TxFCf[tc]−TxFCf[tp]|−|RxFCl[tc]−RxFCl[tp]|)/(frame sending interval of the frame loss ratio measurement message frame*(N[tc]−N[tp])); wherein with respect to the first end, the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame; and with respect to the second end, the far-end frame loss ratio is the frame loss ratio of the first end in the case that the second end sends the frame loss ratio measurement message frame, and the near-end frame loss ratio is the frame loss ratio of the second end in the case that the second end sends the frame loss ratio measurement message frame; TxFCf[tc] is the number of sent frames of the present end when sending the current frame loss ratio measurement message frame, and is carried in the current measurement reply frame; TxFCf[tp] is the number of sent frames of the present end when sending the previous frame loss ratio measurement message frame, and is carried in the previous measurement reply frame; RxFCb[tc] is the number of received frames of the present end when receiving the current frame loss ratio measurement message frame sent by the opposite end, and is carried in the current measurement reply frame; RxFCb[tp] is the number of received frames of the present end when receiving the previous frame loss ratio measurement message frame sent by the opposite end, and is carried in the previous measurement reply frame; TxFCb[tc] is the number of sent frames of the opposite end when sending the current frame loss ratio measurement message frame, and is carried in the current measurement reply frame; TxFCb[tp] is the number of sent frames of the opposite end when sending the previous frame loss ratio measurement message frame, and is carried in the previous measurement reply frame; RxFCl[tc] is the number of received frames of the opposite end when receiving the current frame loss ratio measurement message frame sent by the present end, and is carried in the current measurement reply frame; RxFCl[tp] is the number of received frames of the opposite end when receiving the previous frame loss ratio measurement message frame sent by the present end, and is carried in the previous measurement reply frame; N[tc] is the frame number of the current measurement reply frame and is carried in the current measurement reply frame; and N[tp] is the frame number of the previous measurement reply frame and is carried in the previous measurement reply frame; wherein the present end is the first end in the case that the first end sends the frame loss ratio measurement message frame, and is the second end in the case that the second end sends the frame loss ratio measurement message frame; and the opposite end is the second end in the case that the first end sends the frame loss ratio measurement message frame, and is the first end in the case that the second end sends the frame loss ratio measurement message frame.

In the disclosure, whether there is a protocol frame loss phenomenon can be judged based on the difference between the frame numbers of two successive measurement reply frames, and in the case that a protocol frame is lost, the frame loss ratio is calculated based on the difference between the frame numbers. In this way, the problem in the prior art that frame loss ratio measurement is inaccurate in the case that a protocol frame is lost can be solved, thereby achieving the technical effect of accurately measuring the frame loss ratio.

BRIEF DESCRIPTION OF THE DRAWINGS

Drawings, provided for further understanding of the disclosure and forming a part of the application, are used to explain the disclosure together with embodiments of the disclosure rather than to limit the disclosure. In the drawings.

DETAILED DESCRIPTION OF THE EMBODIMENTS

Embodiment 1

Figure 1:
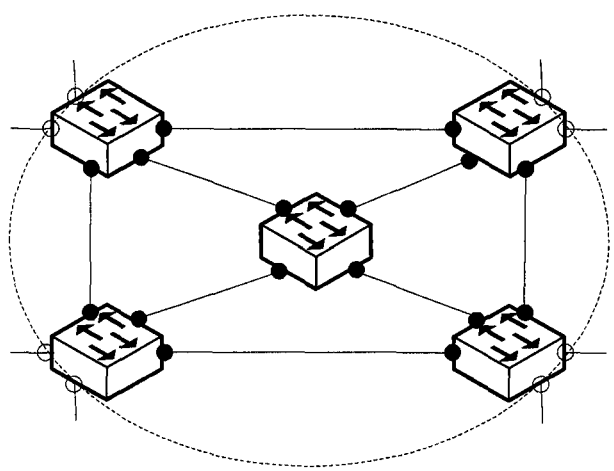
FIG. 1 is a schematic diagram of a single maintenance domain according to the related technique.
Figure 2:
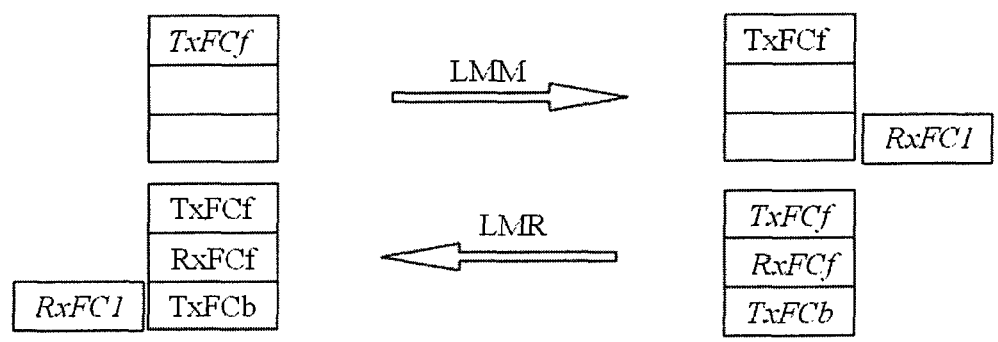
FIG. 2 is a schematic diagram of a single-ended frame loss ratio measurement according to the related technique.
Figure 3:
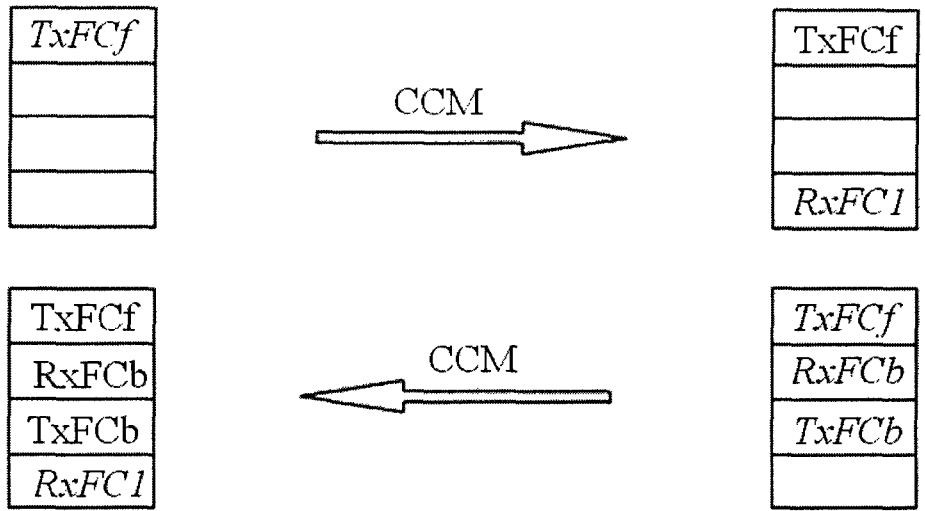
FIG. 3 is a schematic diagram of a dual-ended frame loss ratio measurement according to the related technique.
Figure 4:
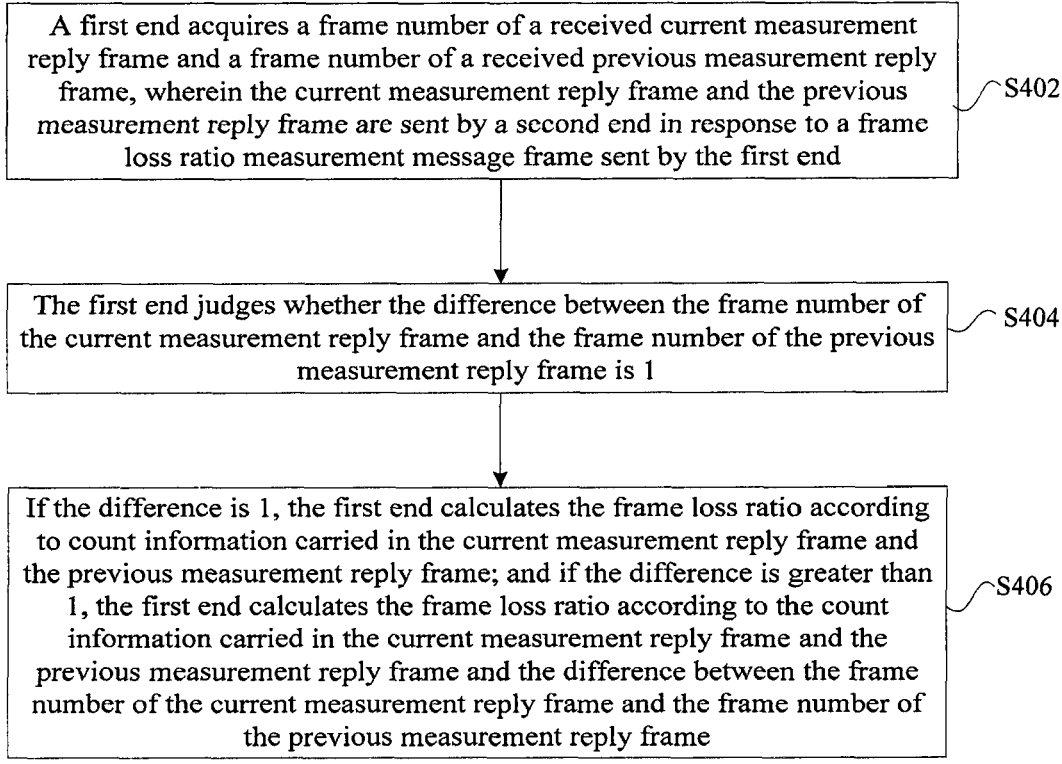
FIG. 4 is a preferred flow chart of a method for measuring a frame loss ratio according to an embodiment of the disclosure.

FIG. 4 is a preferred flow chart of a method for measuring a frame loss ratio according to an embodiment of the disclosure, which includes the following steps.

S402, A first end acquires a frame number of a received current measurement reply frame and a frame number of a received previous measurement reply frame, wherein the current measurement reply frame and the previous measurement reply frame are sent by a second end in response to a frame loss ratio measurement message frame sent by the first end.

Specifically, S402 includes the following steps.

Figures 7, 8:
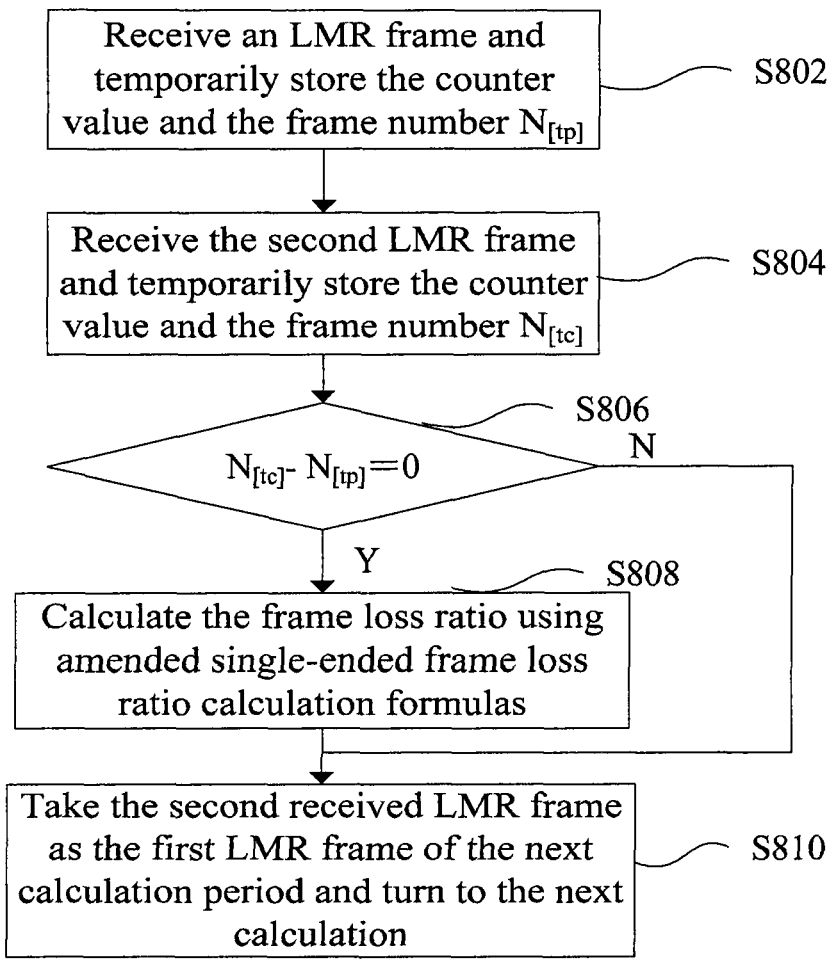
FIG. 7 is a schematic diagram of a TLV format carrying a frame number according to an embodiment of the disclosure.
FIG. 8 is a preferred flow chart for singled-ended frame loss ratio calculation according to an embodiment of the disclosure.

1) The first end (i.e., the active end, also the initiating end for single-ended frame loss ratio measurement, and either of the two ends for dual-ended frame loss ratio measurement) sends a frame loss ratio measurement message (a Loss Measurement Message (LMM) frame or a Continuity Check Message (CCM) frame), with the measurement message frame carrying the value of the counter for sent frames of the present end and the frame number, wherein when the measurement message is an LMM, the frame number is carried in an Organization-Specific TLV, the format thereof being as shown in FIG. 7, and when the measurement message is a CCM, the frame number is a Sequence Number field.

2) The second end (i.e., the passive end) receives the measurement message frame, records the value of the counter for received frames, and replies with a measurement reply (a Loss Measurement Reply (LMR) frame or a Continuity Check Message (CCM) frame), with the measurement reply frame carrying the value of the counter for received frames recorded by the present end, the value of the counter for sent frames of the present end, and the value of the counter for sent frames carried over by the measurement message frame, and the same frame number as that of the received measurement message frame (in the CCM frame, it means the frame number of the CCM received most recently), wherein the frame number carried in the measurement reply frame is carried in the TLV shown in FIG. 7.

That is to say, the frame number carried in the measurement reply frame is preferably the frame number in the measurement message frame.

3) After receiving the measurement reply frame, the active end records the value of the counter for received frames and the counter value and the frame number carried in the measurement reply frame.

4) Repeat 1) to 3), and note that the frame number of the measurement message frame is increased by 1 based on the frame number used last time.

S404, The first end judges whether the difference between the frame number of the current measurement reply frame and the frame number of the previous measurement reply frame is 1.

The active end calculates the frame loss situation within this period of time according to two successively received measurement reply frames, and if the difference between the frame numbers of the two measurement reply frames is 1, the frame loss ratio is calculated based on the formulas shown in Formula 1 and Formula 2. If the difference between the frame numbers of the two measurement reply frames is not 1, it represents that one or more protocol frames are lost over the link and it is needed to amend the calculation result using the frame numbers carried in the protocol frames.

S406, If the difference between the frame number of the current measurement reply frame and the frame number of the previous measurement reply frame is 1, the first end calculates the frame loss ratio according to count information carried in the current measurement reply frame and the previous measurement reply frame; and if the difference between the frame number of the current measurement reply frame and the frame number of the previous measurement reply frame is greater than 1, the first end calculates the frame loss ratio according to the count information carried in the current measurement reply frame and the previous measurement reply frame and the difference between the frame numbers. Preferably, the frame loss ratio here refers to the frame loss ratio of the link.

In a preferred embodiment of the disclosure, whether there is a protocol frame loss phenomenon can be judged based on the difference between the frame numbers of two successive measurement reply frames, and in the case that a protocol frame is lost, the frame loss ratio is calculated based on the difference between the frame numbers. In this way, the problem in the prior art that frame loss ratio measurement is inaccurate in the case that a protocol frame is lost can be solved, thereby achieving the technical effect of accurately measuring the frame loss ratio.

When the frame number of the current measurement reply frame and the frame number of the previous measurement reply frame is 1, the disclosure provides a preferred step of calculating the frame loss ratio. Specifically, the step of the first end calculating the frame loss ratio according to count information carried in the current measurement reply frame and the previous measurement reply frame includes:

$$\text{far-end frame loss ratio} = (|TxFCf[tc] - TxFCf[tp]| - |RxFCf[tc] - RxFCf[tp]|)/\text{frame sending interval of the frame loss ratio measurement message frame;} \quad \text{(Formula 3)}$$

$$\text{near-end frame loss ratio} = (|TxFCb[tc]|TxFCb[tp]| - |RxFCl[tc] - RxFCl[tp]|)/\text{frame sending interval of the frame loss ratio measurement message frame;} \quad \text{(Formula 4)}$$

wherein the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame;

$TxFCf[tc]$ is the number of sent frames of the first end when sending the current frame loss ratio measurement message frame, and is carried in the current measurement reply frame;

$TxFCf[tp]$ is the number of sent frames of the first end when sending the previous frame loss ratio measurement message frame, and is carried in the previous measurement reply frame;

$RxFCf[tc]$ is the number of received frames of the second end when receiving the current frame loss ratio measurement message frame, and is carried in the current measurement reply frame;

$RxFCf[tp]$ is the number of received frames of the second end when receiving the previous frame loss ratio measurement message frame, and is carried in the previous measurement reply frame;

$TxFCb[tc]$ is the number of sent frames of the second end when sending the current measurement reply frame, and is carried in the current measurement reply frame;

$TxFCb[tp]$ is the number of sent frames of the second end when sending the previous measurement reply frame, and is carried in the previous measurement reply frame;

$RxFCl[tc]$ is the number of received frames of the first end when receiving the current measurement reply frame, and is recorded in the first end; and $RxFCl[tp]$ is the number of received frames of the first end when receiving the previous measurement reply frame, and is recorded in the first end.

If the second end sends to the first end a frame loss ratio measurement message frame when the first end sends to the second end a frame loss ratio measurement message frame, an embodiment of the disclosure further provides a preferred step of calculating the dual-ended frame loss ratio. Specifically, the method for measuring the frame loss ratio further includes: calculating the frame loss ratio in the following steps under the circumstance that both the first end and the second end send the frame loss ratio measurement message frame to each other:

$$\text{far-end frame loss ratio}=(|TxFCb[tc]-TxFCb[tp]|-|RxFCb[tc]-RxFCb[tp]|)/\text{frame sending interval of the frame loss ratio measurement message frame} \quad \text{(Formula 5)};$$

$$\text{near-end frame loss ratio}=(|TxFCf[tc]-TxFCf[tp]|-|RxFCl[tc]-RxFCl[tp]|)/\text{frame sending interval of the frame loss ratio measurement message frame} \quad \text{(Formula 6)};$$

wherein with respect to the first end, the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame, and with respect to the second end, the far-end frame loss ratio is the frame loss ratio of the first end in the case that the second end sends the frame loss ratio measurement message frame, and the near-end frame loss ratio is the frame loss ratio of the second end in the case that the second end sends the frame loss ratio measurement message frame;

$TxFCf[tc]$ is the number of sent frames of the present end when sending the current frame loss ratio measurement message frame, and is carried in the current measurement reply frame;

$TxFCf[tp]$ is the number of sent frames of the present end when sending the previous frame loss ratio measurement message frame, and is carried in the previous measurement reply frame;

$RxFCb[tc]$ is the number of received frames of the present end when receiving the current frame loss ratio measurement message frame sent by the opposite end, and is carried in the current measurement reply frame;

$RxFCb[tp]$ is the number of received frames of the present end when receiving the previous frame loss ratio measurement message frame sent by the opposite end, and is carried in the previous measurement reply frame;

$TxFCb[tc]$ is the number of sent frames of the opposite end when sending the current frame loss ratio measurement message frame, and is carried in the current measurement reply frame;

$TxFCb[tp]$ is the number of sent frames of the opposite end when sending the previous frame loss ratio measurement message frame, and is carried in the previous measurement reply frame;

$RxFCl[tc]$ is the number of received frames of the opposite end when receiving the current frame loss ratio measurement message frame sent by the present end, and is carried in the current measurement reply frame; and $RxFCl[tp]$ is the number of received frames of the opposite end when receiving the previous frame loss ratio measurement message frame sent by the present end, and is carried in the previous measurement reply frame;

wherein the present end is the first end in the case that the first end sends the frame loss ratio measurement message frame, and is the second end in the case that the second end sends the frame loss ratio measurement message frame; and the opposite end is the second end in the case that the first end sends the frame loss ratio measurement message frame, and is the first end in the case that the second end sends the frame loss ratio measurement message frame.

Preferably, when the first end judges that the difference between the frame number of the current measurement reply frame and the frame number of the previous measurement reply frame is 0, this measurement is stopped.

After the first end judges that the difference between the frame number of the current measurement reply frame and the frame number of the previous measurement reply frame is greater than 1, the first end calculates the frame loss ratio according to the count information carried in the current measurement reply frame and the previous measurement reply frame and the difference between the frame numbers. In a preferred embodiment of the disclosure, when the difference between the frame numbers of two successive measurement reply frames is greater than 1, taking the difference between the frame numbers as one of the parameters for calculating the frame loss ratio measurement can accurately calculate the frame loss ratio in the case that a protocol frame is lost.

The step of the first end calculating the frame loss ratio according to the count information carried in the current measurement reply frame and the previous measurement reply frame and the difference between the frame numbers includes:

$$\text{far-end frame loss ratio}=(|TxFCf[tc]-TxFCf[tp]|-|(RxFcf[tc]-RxFCf[tp]|)/(\text{frame sending interval of the frame loss ratio measurement message frame}*(N[tc]-N[tp])); \quad \text{(Formula 7)}$$

$$\text{near-end frame loss ratio}=(|TxFCb[tc]-TxFCb[tp]|-|RxFCl[tc]-RxFCl[tp]|)/(\text{frame sending interval of the frame loss ratio measurement message frame}*(N[tc]-N[tp])); \quad \text{(Formula 8)}$$

wherein the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame;

$TxFCf[tc]$ is the number of sent frames of the first end when sending the current frame loss ratio measurement message frame, and is carried in the current measurement reply frame;

$TxFCf[tp]$ is the number of sent frames of the first end when sending the previous frame loss ratio measurement message frame, and is carried in the previous measurement reply frame;

$RxFCf[tc]$ is the number of received frames of the second end when receiving the current frame loss ratio measurement message frame, and is carried in the current measurement reply frame;

$RxFCf[tp]$ is the number of received frames of the second end when receiving the previous frame loss ratio measurement message frame, and is carried in the previous measurement reply frame;

$TxFCb[tc]$ is the number of sent frames of the second end when sending the current measurement reply frame, and is carried in the current measurement reply frame;

$TxFCb[tp]$ is the number of sent frames of the second end when sending the previous measurement reply frame, and is carried in the previous measurement reply frame;

$RxFCl[tc]$ is the number of received frames of the first end when receiving the current measurement reply frame, and is recorded in the first end;

$RxFCl[tp]$ is the number of received frames of the first end when receiving the previous measurement reply frame, and is recorded in the first end;

N[tc] is the frame number of the current measurement reply frame and is carried in the current measurement reply frame; and N[tp] is the frame number of the previous measurement reply frame and is carried in the previous measurement reply frame.

If the second end sends to the first end a frame loss ratio measurement message frame when the first end sends to the second end a frame loss ratio measurement message frame, the method for measuring the frame loss ratio in this preferred embodiment further includes: calculating the frame loss ratio in the following steps under the circumstance that both the first end and the second end send the frame loss ratio measurement message frame to each other, so as to be used for dual-ended frame loss ratio measurement:

far-end frame loss ratio=(|*TxFCb[tc]*-*TxFCb[tp]*|-|*RxFCb[tc]*-*RxFCb[tp]*|)/(frame sending interval of the frame loss ratio measurement message frame*(*N[tc]*-*N[tp]*));   (Formula 9)

near-end frame loss ratio=(|*TxFCf[tc]*-*TxFCf[tp]*|-|*RxFCl[tc]*-*RxFCl[tp]*|)/(frame sending interval of the frame loss ratio measurement message frame*(*N[tc]*-*N[tp]*));   (Formula 10)

with respect to the first end, the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame, and with respect to the second end, the far-end frame loss ratio is the frame loss ratio of the first end in the case that the second end sends the frame loss ratio measurement message frame, and the near-end frame loss ratio is the frame loss ratio of the second end in the case that the second end sends the frame loss ratio measurement message frame;

TxFCf[tc] is the number of sent frames of the present end when sending the current frame loss ratio measurement message frame, and is carried in the current measurement reply frame;

TxFCf[tp] is the number of sent frames of the present end when sending the previous frame loss ratio measurement message frame, and is carried in the previous measurement reply frame;

RxFCb[tc] is the number of received frames of the present end when receiving the current frame loss ratio measurement message frame sent by the opposite end, and is carried in the current measurement reply frame;

RxFCb[tp] is the number of received frames of the present end when receiving the previous frame loss ratio measurement message frame sent by the opposite end, and is carried in the previous measurement reply frame;

TxFCb[tc] is the number of sent frames of the opposite end when sending the current frame loss ratio measurement message frame, and is carried in the current measurement reply frame;

TxFCb[tp] is the number of sent frames of the opposite end when sending the previous frame loss ratio measurement message frame, and is carried in the previous measurement reply frame;

RxFCl[tc] is the number of received frames of the opposite end when receiving the current frame loss ratio measurement message frame sent by the present end, and is carried in the current measurement reply frame;

RxFCl[tp] is the number of received frames of the opposite end when receiving the previous frame loss ratio measurement message frame sent by the present end, and is carried in the previous measurement reply frame;

N[tc] is the frame number of the current measurement reply frame and is carried in the current measurement reply frame; and N[tp] is the frame number of the previous measurement reply frame and is carried in the previous measurement reply frame;

wherein the present end is the first end in the case that the first end sends the frame loss ratio measurement message frame, and is the second end in the case that the second end sends the frame loss ratio measurement message frame; and the opposite end is the second end in the case that the first end sends the frame loss ratio measurement message frame, and is the first end in the case that the second end sends the frame loss ratio measurement message frame.

Embodiment 2

Figure 5:
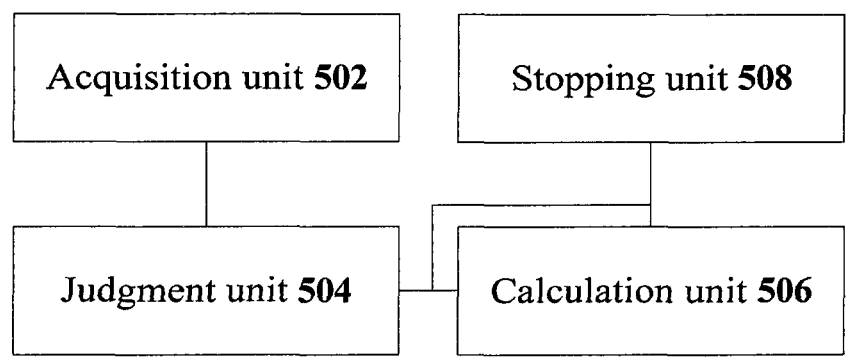
FIG. 5 is a preferred structural diagram of a system for measuring a frame loss ratio according to an embodiment of the disclosure.

FIG. 5 is a preferred structural diagram of a system for measuring a frame loss ratio according to an embodiment of the disclosure, which includes: an acquisition unit 502, configured to acquire a frame number of a current measurement reply frame received by a first end and a frame number of a previous measurement reply frame received by the first end, wherein the current measurement reply frame and the previous measurement reply frame are sent by a second end in response to a frame loss ratio measurement message frame sent by the first end; a judgment unit 504 coupled with the acquisition unit 502 and configured to judge whether the difference between the frame number of the current measurement reply frame and the frame number of the previous measurement reply frame is 1; and a calculation unit 506 coupled with the judgment unit 504 and configured to calculate the frame loss ratio according to count information carried in the current measurement reply frame and the previous measurement reply frame if the difference between the frame numbers is 1; and calculate the frame loss ratio according to the count information carried in the current measurement reply frame and the previous measurement reply frame and the difference between the frame numbers if the difference between the frame numbers is greater than 1.

In a preferred embodiment of the disclosure, whether there is a protocol frame loss phenomenon can be judged based on the difference between the frame numbers of two successive measurement reply frames, and in the case that a protocol frame is lost, the frame loss ratio is calculated based on the difference between the frame numbers. In this way, the problem in the prior art that frame loss ratio measurement is inaccurate in the case that a protocol frame is lost can be solved, thereby achieving the technical effect of accurately measuring the frame loss ratio.

When the difference between the frame number of the current measurement reply frame and the frame number of the previous measurement reply frame is 1, the calculation unit 506 calculates the frame loss ratio of a link according to Formulas 3-6. The specific process therein may refer to Embodiment 1 and is not described here again.

In addition, the system for measuring the frame loss ratio further includes: a stopping unit 508 coupled with the judgment unit 504 and configured to stop this measurement when the difference between the frame numbers is equal to 0.

The calculation unit 506 includes a first calculation module configured to calculate the frame loss ratio of a link according to Formulas 7 and 8 when the difference between the frame numbers is greater than 1. The specific process therein may refer to Embodiment 1 and is not described here again.

The calculation unit 506 includes a second calculation module configured to calculate the frame loss ratio of the link through Formulas 9 and 10 in the case that the second end sends to the first end a frame loss ratio measurement message frame when the first end sends to the second end a frame loss ratio measurement message frame. The specific process therein may refer to Embodiment 1 and is not described here again.

Embodiment 3

Figure 6:
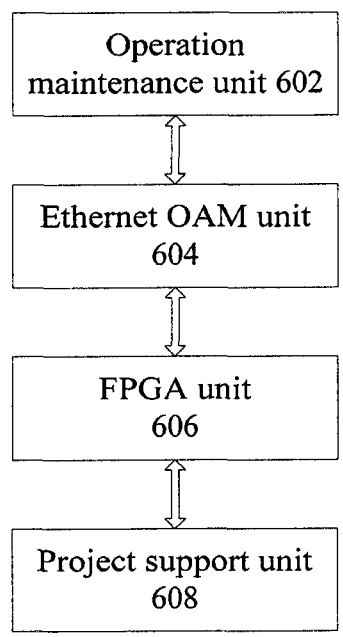
FIG. 6 is another preferred structural diagram of the system for measuring the frame loss ratio according to an embodiment of the disclosure.

FIG. 6 is another preferred structural diagram of the system for measuring the frame loss ratio according to an embodiment of the disclosure. The system includes: an operation maintenance unit 602, an Ethernet OAM unit 604, an FPGA unit 606 and a project support unit 608.

The operation maintenance unit 602 is responsible for receiving a configuration command of an administrator and displaying the frame loss ratio measurement result, for example, initiating a frame loss ratio measurement, viewing the frame loss ratio measurement result, and so on.

The Ethernet OAM unit 604 is responsible for sending and receiving a protocol frame and calculating the frame loss ratio according to the count value in the protocol frame, for example, calculating the frame loss ratio of a link according to Formulas 3-10 in embodiments 1 and 2; the specific process therein may refer to Embodiment 1 and is not described here again.

The FPGA unit 606 is responsible for adding the local count value into a corresponding field of the protocol frame when the protocol frame passes through the FPGA unit.

The project support unit 608 is responsible for the interaction between the Ethernet OAM unit and the FPGA unit. For example, the project support unit 608 issues the configuration of the Ethernet OAM unit to the FPGA unit, or sends the protocol frame of the Ethernet OAM unit to the FPGA unit so as to be added with the counter value.

The method used in this preferred embodiment adopts the method of increasing the frame number in the protocol frame, which achieves accurate measurement of the frame loss ratio, and compared with the prior art, avoids the measurement errors caused by protocol frame loss.

Embodiment 4

The method for measuring the single-ended frame loss ratio in this embodiment includes the following steps.

S802: An active end MEP is triggered, via a command, to send an LMM frame, wherein the LMM frame number is set as N and the LMM frame carries the following information:

TxFCf: numerical value of the local counter TxFCl when the LMM frame is transmitted.

S804: A passive end receives the LMM frame, records the value of the counter RxFCl for received frames and replies with an LMR frame, wherein the LMR frame uses the same frame number N as that of the received LMM and carries the following information:

TxFCf: numerical value of TxFCf copied from the LMM frame,

RxFCf: numerical value of the local counter RxFCl when the LMM frame is received, TxFCb: numerical value of the local counter TxFCl when the LMR frame is transmitted.

S806: After receiving the LMR, the active end records the value of the counter RxFCl for received frames and the counter values TxFCf, RxFCf, TxFCb and the frame number N carried in the LMR. In this step, four counter values and one frame number are obtained at this moment, which are respectively marked as TxFCf[tp], RxFCf[tp], TxFCb[tp], RxFCl[tp] and N[tp].

S808: S802 to S806 are repeated, and it should be noted that the frame number of the LMM and the LMR is increased by 1 based on the frame number used last time, and four more counter values and one frame number are obtained at this moment, which are respectively marked as TxFCf[tc], RxFCf[tc], TxFCb[tc], RxFCl[tc] and N[tc].

S810: The active end calculates the frame loss situation within this period of time according to two successively received LMR frames. The calculation process is as follows.

If the difference between the frame numbers of two LMRs is 1, i.e., N[tc]−N[tp]=1, the far-end frame loss ratio and the near-end frame loss ratio are calculated based on Formula 1, and in addition, information like average frame loss ratio and frame loss ratio jitter, etc. can also be calculated. The formulas for calculating the frame loss ratio are as follows:

$$\text{far-end frame loss ratio} = (|TxFCf[tc] - TxFCf[tp]| - |RxFCf[tc] - RxFCf[tp]|)/\text{frame sending interval of LMM}$$

$$\text{near-end frame loss ratio} = (|TxFCb[tc] - TxFCb[tp]| - |RxFCl[tc] - RxFCl[tp]|)/\text{frame sending interval of LMM}.$$

If the time interval for the active end to send an LMM frame is 1 second, the formulas for calculating the frame loss ratio can be simplified as:

$$\text{far-end frame loss ratio} = |TxFCf[tc] - TxFCf[tp]| - |RxFCf[tc] - RxFCf[tp]|$$

$$\text{near-end frame loss ratio} = |TxFCb[tc] - TxFCb[tp]| - |RxFCl[tc] - RxFCl[tp]|.$$

If the frame numbers of two LMRs are equal, i.e., N[tc]−N[tp]=0, this is an error situation because in normal conditions this situation should not appear, so this calculation is abandoned.

If the difference between the frame numbers of two LMRs is not 1, i.e., N[tc]−N[tp]≠1, it represents that an LMM or LMR is lost over the link and it is needed to amend the calculation result using the frame numbers carried in the two LMRs. For example, if N[tc]−N[tp]=2, it represents that an LMM or LMR is lost over the link, the interval between two successively received LMRs at this moment is actually twice the frame sending interval of the LMM, and if the above-mentioned formulas are still used for calculation, the obtained result will be twice the correct value. After introducing frame numbers for the LMM and LMR, the formulas for calculating the frame loss ratio can be amended as:

$$\text{far-end frame loss ratio} = (|TxFCf[tc] - TxFCf[tp]| - |RxFCf[tc] - RxFCf[tp]|)/(\text{frame sending interval of LMM} * (N[tc] - N[tp]));$$

of course, this formula can also be used in the scenario where the difference between the frame numbers of the above-mentioned two LMRs is 1, i.e., N[tc]−N[tp]=1 at this moment;

$$\text{near-end frame loss ratio} = (|TxFCb[tc] - TxFCb[tp]| - |RxFCl[tc] - RxFCl[tp]|)/(\text{frame sending interval of LMM} * (N[tc] - N[tp]));$$

of course, this formula can also be used in the scenario where the difference between the frame numbers of the above-mentioned two LMRs is 1, i.e., N[tc]−N[tp]=1 at this moment.

If the time interval for the active end to send an LMM frame is 1 second, the formulas for calculating the frame loss ratio can be simplified as:

far-end frame loss ratio=$(|TxFCf[tc]-TxFCf[tp]|-|RxFCf[tc]-RxFCf[tp]|)/(N[tc]-N[tp])$ near-end frame loss ratio=$(|TxFCb[tc]-TxFCb[tp]|-|RxFCl[tc]-RxFCl[tp]|)/(N[tc]-N[tp])$.

The amended single-ended frame loss ratio calculation process can be described visually with the flow chart shown in FIG. 8.

This embodiment measures the frame loss ratio by using the amended formulas, and the use of amended formulas to measure the frame loss ratio can avoid measurement result errors caused by protocol frame loss, and ensure the accuracy of the measurement results.

Embodiment 5

The method for measuring the dual-ended frame loss ratio in this embodiment includes the following steps.

S902: A dual-ended frame loss ratio measurement is initiated, via a command, at both ends, and in addition to Sequence Number, the CCM frames transmitted by both ends also carry the following information:

TxFCf: numerical value of the local counter TxFCl when a CCM frame is transmitted.

RxFCb: numerical value of the local counter RxFCl when the last CCM frame is received from a peer MEP.

TxFCb: numerical value of TxFCf in the last CCM frame received from the peer MEP.

N: numerical value of Sequence Number in the last CCM frame received from the peer MEP.

If no CCM frame has ever been received, RxFCb, TxFCb and N are all filled with 0.

S904: Both ends receive a CCM frame respectively, and add the value RxFCl of the local counter for received frames into the received CCM, and both ends respectively check whether the frame number of the most recently received CCM in the received CCM frames is 0, and if it is 0, the frame is unavailable, corresponding information is recorded and the frame is discarded, and turn to S906; and if the frame number of the most recently received CCM is not 0, the counter value of the received CCM frame and the value of the frame number of the most recently received CCM are recorded, if two available CCM frames have been received, turn to S908, otherwise turn to S906.

S906: S902 to S904 (note that according to 802.1ag agreement, the Sequence Numbers of the CCM frames are incremental) are repeated until two available CCM frames are received, and then start to measure the frame loss ratio; here, [tc] is used to mark the information carried in the currently received CCM frame, and [tp] is used to mark the information carried in the CCM frame received last time. The specific meanings are as follows:

TxFCf[tc], RxFCf[tc], TxFCb[tc], RxFCl[tc]: counter value carried in the currently received CCM frame;

N[tc]: value of the frame number of the most recently received CCM carried in the currently received CCM frame;

TxFCf[tp], RxFCf[tp], TxFCb[tp], RxFCl[tp]: counter value carried in the CCM frame received last time;

N[tp]: value of the frame number of the most recently received CCM carried in the CCM frame received last time;

frame loss ratio measurement is conducted using the information carried in the above-mentioned two CCM frames.

S908: Both ends calculate the frame loss situation within this period of time according to two successively received CCM frames respectively. The calculation process is as follows.

If the difference between the frame numbers of the most recently received CCMs of the two CCM frames is 1, i.e. N[tc]−N[tp]=1, the far-end frame loss ratio and the near-end frame loss ratio are calculated based on Formula 2, and in addition, information like the average frame loss ratio and the frame loss ratio jitter, etc. can also be calculated. The formulas for calculating the frame loss ratio are as follows:

far-end frame loss ratio=$(|TxFCb[tc]-TxFCb[tp]|-|RxFCb[tc]-RxFCb[tp]|)/$frame sending interval of CCM near-end frame loss ratio=$(|TxFCf[tc]-TxFCf[tp]|-|RxFCl[tc]-RxFCl[tp]|)/$frame sending interval of CCM.

If the frame sending interval of the CCM frames is 1 second, the formulas for calculating the frame loss ratio can be simplified as:

far-end frame loss ratio=$|TxFCb[tc]-TxFCb[tp]|-|RxFCb[tc]-RxFCb[tp]|$ near-end frame loss ratio=$|TxFCf[tc]-TxFCf[tp]|-|RxFCl[tc]-RxFCl[tp]|$ S910-S914, It is judged whether the frame numbers of the most recently received CCMs of the two CCM frames are equal. If the frame numbers of the most recently received CCMs of the two CCM frames are equal, i.e., N[tc]−N[tp]=0, it represents that a CCM frame is lost at the far end, and in this circumstance, the information in this CCM frame is recorded, this frame is discarded, and this calculation is abandoned.

If the frame numbers of the most recently received CCMs of the two CCM frames are not equal, and the difference therebetween is not 1, i.e., N[tc]−N[tp]≠0 and N[tc]−N[tp]≠1, it represents that a CCM is lost at the near end, and it is needed to use the frame numbers of the most recently received CCMs carried in the protocol frame to amend the calculation results. For example, if N[tc]−N[tp]=2, it represents that one CCM is lost at the near end, the interval between two successively received CCMs at this moment is actually twice the frame sending interval of the CCM, and if the above-mentioned formulas are still used, the obtained result will be twice the correct value. After introducing the frame number of the most recently received CCM for a CCM, the formulas for calculating the frame loss ratio can be amended as:

far-end frame loss ratio=$(|TxFCb[tc]-TxFCb[tp]|-|RxFCb[tc]-RxFCb[tp]|)/$(frame sending interval of CCM*$(N[tc]-N[tp])$)

near-end frame loss ratio=$(|TxFCf[tc]-TxFCf[tp]|-|RxFCl[tc]-RxFCl[tp]|)/$(frame sending interval of CCM*$(N[tc]-N[tp])$).

If the frame sending interval of the CCM frames is 1 second, the formulas for calculating the frame loss ratio can be simplified as:

far-end frame loss ratio=$(|TxFCb[tc]-TxFCb[tp]|-|RxFCb[tc]-RxFCb[tp]|)/(N[tc]-N[tp])$ near-end frame loss ratio=$(|TxFCf[tc]-TxFCf[tp]|-|RxFCl[tc]-RxFCl[tp]|)/(N[tc]-N[tp])$.

Figure 9:
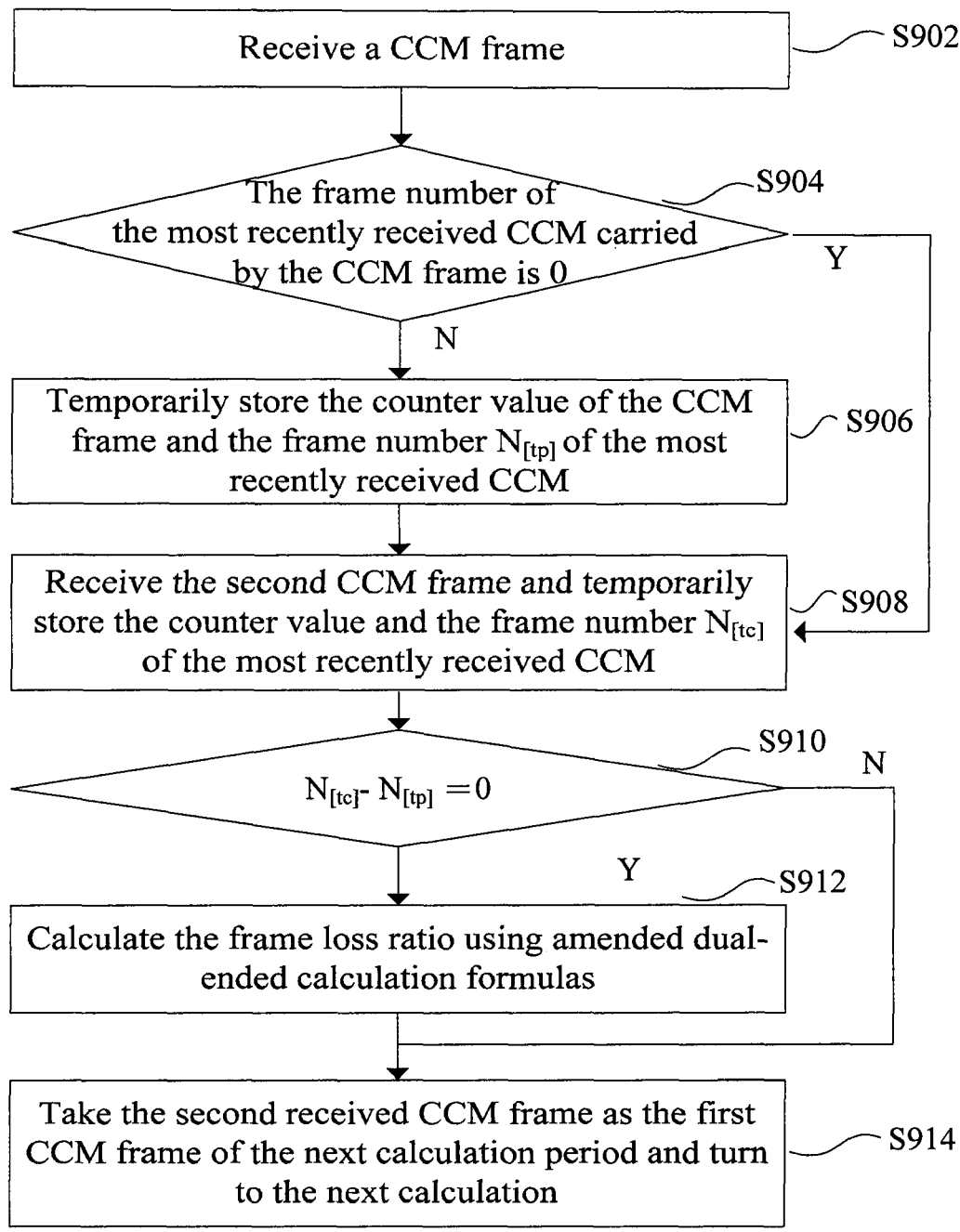
FIG. 9 is a preferred flow chart for dual-ended frame loss ratio calculation according to an embodiment of the disclosure.

The amended dual-ended frame loss ratio calculation process can be described visually with the flow chart shown in FIG. 9.

This embodiment measures the frame loss ratio using the amended formulas, and the use of amended formulas to measure the frame loss ratio can avoid measurement result errors caused by protocol frame loss, and ensure the accuracy of the measurement results.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for measuring a frame loss ratio, comprising:
a first end acquiring a frame number of a received current measurement reply frame and a frame number of a received previous measurement reply frame, wherein the current measurement reply frame and the previous measurement reply frame are sent by a second end in response to a frame loss ratio measurement message frame sent by the first end, wherein the first end and the second end are Maintenance association End Points (MEPs) which are implemented on switches;
the first end judging whether the difference between the frame number of the current measurement reply frame and the frame number of the previous measurement reply frame is 1;
if the difference is 1, the first end calculating the frame loss ratio according to count information carried in the current measurement reply frame and the previous measurement reply frame; and
if the difference is greater than 1, the first end calculating the frame loss ratio according to count information carried in the current measurement reply frame and the previous measurement reply frame and the difference;
wherein the step of the first end calculating the frame loss ratio according to the count information carried in the current measurement reply frame and the previous measurement reply frame and the difference between the frame number of the current measurement reply frame and the frame number of the previous measurement reply frame comprises:

$$\text{far-end frame loss ratio} = (|TxFCf[tc] - TxFCf[tp]| - |RxFCf[tc] - RxFCf[tp]|)/(\text{frame sending interval of the frame loss ratio measurement message frame} * (N[tc] - N[tp]));$$

$$\text{near-end frame loss ratio} = (|TxFCb[tc] - TxFCb[tp]| - |RxFCl[tc] - RxFCl[tp]|)/(\text{frame sending interval of the frame loss ratio measurement message frame} * (N[tc] - N[tp]));$$

wherein the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame;
TxFCf[tc] is the number of sent frames of the first end when sending the current frame loss ratio measurement message frame, and is carried in the current measurement reply frame;
TxFCf[tp] is the number of sent frames of the first end when sending the previous frame loss ratio measurement message frame, and is carried in the previous measurement reply frame;
RxFCf[tc] is the number of received frames of the second end when receiving the current frame loss ratio measurement message frame, and is carried in the current measurement reply frame;
RxFCf[tp] is the number of received frames of the second end when receiving the previous frame loss ratio measurement message frame, and is carried in the previous measurement reply frame;
TxFCb[tc] is the number of sent frames of the second end when sending the current measurement reply frame, and is carried in the current measurement reply frame;
TxFCb[tp] is the number of sent frames of the second end when sending the previous measurement reply frame, and is carried in the previous measurement reply frame;
RxFCl[tc] is the number of received frames of the first end when receiving the current measurement reply frame, and is recorded in the first end; and
RxFCl[tp] is the number of received frames of the first end when receiving the previous measurement reply frame, and is recorded in the first end;
N[tc] is the frame number of the current measurement reply frame and is carried in the current measurement reply frame; and
N[tp] is the frame number of the previous measurement reply frame and is carried in the previous measurement reply frame;
wherein the frame sending interval of the frame loss ratio measurement message frame is not 1 second.

2. The method according to claim 1, wherein the step of the first end calculating the frame loss ratio according to the count information carried in the current measurement reply frame and the previous measurement reply frame comprises:

$$\text{far-end frame loss ratio} = (|TxFCf[tc] - TxFCf[tp]| - |RxFCf[tc] - RxFCf[tp]|)/\text{frame sending interval of the frame loss ratio measurement message frame};$$

$$\text{near-end frame loss ratio} = (|TxFCb[tc] - TxFCb[tp]| - |RxFCl[tc] - RxFCl[tp]|)/\text{frame sending interval of the frame loss ratio measurement message frame};$$

wherein the far-end frame loss ratio is the frame loss ratio of the second end under the circumstance that the first end sends the frame loss ratio measurement message frame, and the near-end frame loss ratio is the frame loss ratio of the first end under the circumstance that the first end sends the frame loss ratio measurement message frame;
TxFCf[tc] is the number of sent frames of the first end when sending the current frame loss ratio measurement message frame, and is carried in the current measurement reply frame;

TxFCf[tp] is the number of sent frames of the first end when sending the previous frame loss ratio measurement message frame, and is carried in the previous measurement reply frame;

RxFCf[tc] is the number of received frames of the second end when receiving the current frame loss ratio measurement message frame, and is carried in the current measurement reply frame;

RxFCf[tp] is the number of received frames of the second end when receiving the previous frame loss ratio measurement message frame, and is carried in the previous measurement reply frame;

TxFCb[tc] is the number of sent frames of the second end when sending the current measurement reply frame, and is carried in the current measurement reply frame;

TxFCb[tp] is the number of sent frames of the second end when sending the previous measurement reply frame, and is carried in the previous measurement reply frame;

RxFCl[tc] is the number of received frames of the first end when receiving the current measurement reply frame, and is recorded in the first end; and RxFCl[tp] is the number of received frames of the first end when receiving the previous measurement reply frame, and is recorded in the first end.

3. The method according to claim 1, wherein if the second end sends to the first end a frame loss ratio measurement message frame when the first end sends to the second end a frame loss ratio measurement message frame, the method further comprises: calculating the frame loss ratio in the following steps under the circumstance that both the first end and the second end send the frame loss ratio measurement message frame to each other:

$$\text{far-end frame loss ratio} = (|TxFCb[tc] - TxFCb[tp]| - |RxFCb[tc] - RxFCb[tp]|)/\text{frame sending interval of the frame loss ratio measurement message frame};$$

$$\text{near-end frame loss ratio} = (|TxFCf[tc] - TxFCf[tp]| - |RxFCl[tc] - RxFCl[tp]|)/\text{frame sending interval of the frame loss ratio measurement message frame};$$

wherein with respect to the first end, the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame; and with respect to the second end, the far-end frame loss ratio is the frame loss ratio of the first end in the case that the second end sends the frame loss ratio measurement message frame, and the near-end frame loss ratio is the frame loss ratio of the second end in the case that the second end sends the frame loss ratio measurement message frame;

TxFCf[tc] is the number of sent frames of the present end when sending the current frame loss ratio measurement message frame, and is carried in the current measurement reply frame;

TxFCf[tp] is the number of sent frames of the present end when sending the previous frame loss ratio measurement message frame, and is carried in the previous measurement reply frame;

RxFCb[tc] is the number of received frames of the present end when receiving the current frame loss ratio measurement message frame sent by the opposite end, and is carried in the current measurement reply frame;

RxFCb[tp] is the number of received frames of the present end when receiving the previous frame loss ratio measurement message frame sent by the opposite end, and is carried in the previous measurement reply frame;

TxFCb[tc] is the number of sent frames of the opposite end when sending the current frame loss ratio measurement message frame, and is carried in the current measurement reply frame;

TxFCb[tp] is the number of sent frames of the opposite end when sending the previous frame loss ratio measurement message frame, and is carried in the previous measurement reply frame;

RxFCl[tc] is the number of received frames of the opposite end when receiving the current frame loss ratio measurement message frame sent by the present end, and is carried in the current measurement reply frame; and RxFCl[tp] is the number of received frames of the opposite end when receiving the previous frame loss ratio measurement message frame sent by the present end, and is carried in the previous measurement reply frame;

wherein the present end is the first end in the case that the first end sends the frame loss ratio measurement message frame, and is the second end in the case that the second end sends the frame loss ratio measurement message frame; and the opposite end is the second end in the case that the first end sends the frame loss ratio measurement message frame, and is the first end in the case that the second end sends the frame loss ratio measurement message frame.

4. The method according to claim 1, wherein after the first end judges whether the difference between the frame number of the current measurement reply frame and the frame number of the previous measurement reply frame is 1, the method further comprises:

if the first end judges that the difference between the frame number of the current measurement reply frame and the frame number of the previous measurement reply frame is 0, stopping current measurement.

5. The method according to claim 1, wherein if the second end sends to the first end a frame loss ratio measurement message frame when the first end sends to the second end a frame loss ratio measurement message frame, the method further comprises: calculating the frame loss ratio in the following steps under the circumstance that both the first end and the second end send the frame loss ratio measurement message frame to each other:

$$\text{far-end frame loss ratio} = (|TxFCb[tc] - TxFCb[tp]| - |RxFCb[tc] - RxFCb[tp]|)/(\text{frame sending interval of the frame loss ratio measurement message frame} * (N[tc] - N[tp]));$$

$$\text{near-end frame loss ratio} = (|TxFCf[tc] - TxFCf[tp]| - |RxFCl[tc] - RxFCl[tp]|)/(\text{frame sending interval of the frame loss ratio measurement message frame} * (N[tc] - N[tp]));$$

wherein with respect to the first end, the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame; and with respect to the second end, the far-end frame loss ratio is the frame loss ratio of the first end in the case that the second end sends the frame loss ratio measurement message frame, and the near-end frame loss ratio is the frame loss ratio of the second end in the case that the second end sends the frame loss ratio measurement message frame;

TxFCf[tc] is the number of sent frames of the present end when sending the current frame loss ratio measurement message frame, and is carried in the current measurement reply frame;

TxFCf[tp] is the number of sent frames of the present end when sending the previous frame loss ratio measurement message frame, and is carried in the previous measurement reply frame;

RxFCb[tc] is the number of received frames of the present end when receiving the current frame loss ratio measurement message frame sent by the opposite end, and is carried in the current measurement reply frame;

RxFCb[tp] is the number of received frames of the present end when receiving the previous frame loss ratio measurement message frame sent by the opposite end, and is carried in the previous measurement reply frame;

TxFCb[tc] is the number of sent frames of the opposite end when sending the current frame loss ratio measurement message frame, and is carried in the current measurement reply frame;

TxFCb[tp] is the number of sent frames of the opposite end when sending the previous frame loss ratio measurement message frame, and is carried in the previous measurement reply frame;

RxFCl[tc] is the number of received frames of the opposite end when receiving the current frame loss ratio measurement message frame sent by the present end, and is carried in the current measurement reply frame;

RxFCl[tp] is the number of received frames of the opposite end when receiving the previous frame loss ratio measurement message frame sent by the present end, and is carried in the previous measurement reply frame;

N[tc] is the frame number of the current measurement reply frame and is carried in the current measurement reply frame; and N[tp] is the frame number of the previous measurement reply frame and is carried in the previous measurement reply frame;

wherein the present end is the first end in the case that the first end sends the frame loss ratio measurement message frame, and is the second end in the case that the second end sends the frame loss ratio measurement message frame; and the opposite end is the second end in the case that the first end sends the frame loss ratio measurement message frame, and is the first end in the case that the second end sends the frame loss ratio measurement message frame.

6. A system for measuring a frame loss ratio, which comprises a first end and a second end, and the first end and the second end are Maintenance association End Points (MEPs) which are implemented on switches, and the system further comprises:

an acquisition unit, configured to acquire a frame number of a current measurement reply frame received by a first end and a frame number of a previous measurement reply frame received by the first end, wherein the current measurement reply frame and the previous measurement reply frame are sent by a second end in response to a frame loss ratio measurement message frame sent by the first end;

a judgment unit, configured to judge whether the difference between the frame number of the current measurement reply frame and the frame number of the previous measurement reply frame is 1; and a calculation unit, configured to calculate the frame loss ratio according to count information carried in the current measurement reply frame and the previous measurement reply frame if the difference is 1; and calculate the frame loss ratio according to the count information carried in the current measurement reply frame and the previous measurement reply frame and the difference if the difference is greater than 1;

wherein the calculation unit comprises: a first calculation module, configured to calculate the frame loss ratio according to the following formulas when the difference between the frame number of the current measurement reply frame and the frame number of the previous measurement reply frame is greater than 1:

far-end frame loss ratio=(|$TxFCf[tc]-TxFCf[tp]$|−|$RxFCf[tc]-RxFCf[tp]$|)/(frame sending interval of the frame loss ratio measurement message frame*($N[tc]-N[tp]$));

near-end frame loss ratio=(|$TxFCb[tc]-TxFCb[tp]$|−|$RxFCl[tc]-RxFCl[tp]$|)/(frame sending interval of the frame loss ratio measurement message frame*($N[tc]-N[tp]$));

wherein the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame;

TxFCf[tc] is the number of sent frames of the first end when sending the current frame loss ratio measurement message frame, and is carried in the current measurement reply frame;

TxFCf[tp] is the number of sent frames of the first end when sending the previous frame loss ratio measurement message frame, and is carried in the previous measurement reply frame;

RxFCf[tc] is the number of received frames of the second end when receiving the current frame loss ratio measurement message frame, and is carried in the current measurement reply frame;

RxFCf[tp] is the number of received frames of the second end when receiving the previous frame loss ratio measurement message frame, and is carried in the previous measurement reply frame;

TxFCb[tc] is the number of sent frames of the second end when sending the current measurement reply frame, and is carried in the current measurement reply frame;

TxFCb[tp] is the number of sent frames of the second end when sending the previous measurement reply frame, and is carried in the previous measurement reply frame;

RxFCl[tc] is the number of received frames of the first end when receiving the current measurement reply frame, and is recorded in the first end; and RxFCl[tp] is the number of received frames of the first end when receiving the previous measurement reply frame, and is recorded in the first end;

N[tc] is the frame number of the current measurement reply frame and is carried in the current measurement reply frame; and N[tp] is the frame number of the previous measurement reply frame and is carried in the previous measurement reply frame;

wherein the frame sending interval of the frame loss ratio measurement message frame is not 1 second.

7. The system according to claim 6, further comprising:

a stopping unit, configured to stop current measurement when the difference between the frame number of the current measurement reply frame and the frame number of the previous measurement reply frame is equal to 0.

8. The system according to claim 6, wherein the calculation unit comprises: a second calculation module, configured to, in the case that the second end sends to the first end a frame loss ratio measurement message frame when the first end sends to the second end a frame loss ratio measurement message frame, calculate the frame loss ratio according to the following formulas under the circumstance that both the first end and the second end send the frame loss ratio measurement message frame to each other:

far-end frame loss ratio=$(|TxFCb[tc]-TxFCb[tp]|-|RxFCb[tc]-RxFCb[tp]|)/$(frame sending interval of the frame loss ratio measurement message frame*$(N[tc]-N[tp])$);

near-end frame loss ratio=$(|TxFCf[tc]-TxFCf[tp]|-|RxFCl[tc]-RxFCl[tp]|)/$(frame sending interval of the frame loss ratio measurement message frame*$(N[tc]-N[tp])$);

wherein with respect to the first end, the far-end frame loss ratio is the frame loss ratio of the second end in the case that the first end sends the frame loss ratio measurement message frame, and the near-end frame loss ratio is the frame loss ratio of the first end in the case that the first end sends the frame loss ratio measurement message frame; and with respect to the second end, the far-end frame loss ratio is the frame loss ratio of the first end in the case that the second end sends the frame loss ratio measurement message frame, and the near-end frame loss ratio is the frame loss ratio of the second end in the case that the second end sends the frame loss ratio measurement message frame;

TxFCf[tc] is the number of sent frames of the present end when sending the current frame loss ratio measurement message frame, and is carried in the current measurement reply frame;

TxFCf[tp] is the number of sent frames of the present end when sending the previous frame loss ratio measurement message frame, and is carried in the previous measurement reply frame;

RxFCb[tc] is the number of received frames of the present end when receiving the current frame loss ratio measurement message frame sent by the opposite end, and is carried in the current measurement reply frame;

RxFCb[tp] is the number of received frames of the present end when receiving the previous frame loss ratio measurement message frame sent by the opposite end, and is carried in the previous measurement reply frame;

TxFCb[tc] is the number of sent frames of the opposite end when sending the current frame loss ratio measurement message frame, and is carried in the current measurement reply frame;

TxFCb[tp] is the number of sent frames of the opposite end when sending the previous frame loss ratio measurement message frame, and is carried in the previous measurement reply frame;

RxFCl[tc] is the number of received frames of the opposite end when receiving the current frame loss ratio measurement message frame sent by the present end, and is carried in the current measurement reply frame;

RxFCl[tp] is the number of received frames of the opposite end when receiving the previous frame loss ratio measurement message frame sent by the present end, and is carried in the previous measurement reply frame;

N[tc] is the frame number of the current measurement reply frame and is carried in the current measurement reply frame; and N[tp] is the frame number of the previous measurement reply frame and is carried in the previous measurement reply frame;

wherein the present end is the first end in the case that the first end sends the frame loss ratio measurement message frame, and is the second end in the case that the second end sends the frame loss ratio measurement message frame; and the opposite end is the second end in the case that the first end sends the frame loss ratio measurement message frame, and is the first end in the case that the second end sends the frame loss ratio measurement message frame.

\* \* \* \* \*